United States Patent
Liverance et al.

(10) Patent No.: US 9,329,920 B2
(45) Date of Patent: May 3, 2016

(54) SUPERVISOR SYSTEM RESUMING CONTROL

(75) Inventors: Fletcher Liverance, Kent, OH (US); Timothy J Freese, Niwot, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 111 days.

(21) Appl. No.: 14/008,235

(22) PCT Filed: Mar. 31, 2011

(86) PCT No.: PCT/US2011/000577
§ 371 (c)(1),
(2), (4) Date: Sep. 27, 2013

(87) PCT Pub. No.: WO2012/013442
PCT Pub. Date: Oct. 4, 2012

(65) Prior Publication Data
US 2014/0019796 A1    Jan. 16, 2014

(51) Int. Cl.
*G06F 11/00*  (2006.01)
*G06F 11/07*  (2006.01)
*G06F 11/14*  (2006.01)

(52) U.S. Cl.
CPC ........ *G06F 11/0772* (2013.01); *G06F 11/1417* (2013.01); *G06F 11/0748* (2013.01); *G06F 11/0793* (2013.01)

(58) Field of Classification Search
CPC . G06F 9/4401; G06F 9/4416; G06F 11/1417; G06F 11/00; G06F 11/0706; G06F 11/0757; G06F 11/0772
See application file for complete search history.

(56) References Cited

U.S. PATENT DOCUMENTS

| | | | |
|---|---|---|---|
| 5,134,580 A | 7/1992 | Bertram et al. | |
| 6,505,298 B1 | 1/2003 | Cerbini et al. | |
| 6,728,896 B1 | 4/2004 | Forbes et al. | |
| 6,763,456 B1 * | 7/2004 | Agnihotri et al. | 713/2 |
| 6,769,077 B2 | 7/2004 | Vachon et al. | |
| 6,857,011 B2 | 2/2005 | Reinke | |
| 7,269,768 B2 * | 9/2007 | Rothman et al. | 714/723 |
| 7,702,955 B2 | 4/2010 | De Almeida et al. | |
| 2002/0078404 A1 | 6/2002 | Vachon et al. | |
| 2003/0005037 A1 | 1/2003 | Aija et al. | |
| 2004/0153834 A1 | 8/2004 | Oshima et al. | |
| 2005/0050385 A1 | 3/2005 | Chen | |
| 2006/0143602 A1 | 6/2006 | Rothman et al. | |

(Continued)

FOREIGN PATENT DOCUMENTS

| | | |
|---|---|---|
| KR | 20080046013 A | 5/2008 |
| TW | 200609829 A | 3/2006 |
| TW | I267785 B | 12/2006 |

OTHER PUBLICATIONS

International Search Report and Written Opinion received in PCT Application No. PCT/US2011/000577, mailed on Nov. 29, 0211, 8 pages.
"SMT IPMI User's Guide", Mar. 4, 2011, pp. 1-106; Super Micro Computer, Inc, USA.
EP Extended Search Report—Application No: 11862715.7-953/2691853 dated Jul. 2, 2015—10 pages.

(Continued)

*Primary Examiner* — Joseph Kudirka
(74) *Attorney, Agent, or Firm* — HP Inc Patent Department

(57) ABSTRACT

Embodiments herein relate to a computing device (100) including a supervisor system (112) and an operating system (122). In an embodiment, the supervisor system is to launch and monitor the operating system. The supervisor system is to resume control of the computing device when a crash occurs in the operating system of the computing device.

14 Claims, 3 Drawing Sheets

(56) References Cited

U.S. PATENT DOCUMENTS

| | | |
|---|---|---|
| 2007/0006226 A1 | 1/2007 | Hendel |
| 2008/0005608 A1 | 1/2008 | Kondajeri et al. |
| 2008/0163256 A1 | 7/2008 | Khanna et al. |
| 2009/0204709 A1 | 8/2009 | Yodaiken |
| 2011/0066879 A1 | 3/2011 | Nakai |

OTHER PUBLICATIONS

Intel, HP; NEC Dell; -IPMI- Intelligen Platform Management Interface Specification Second Generation, Feb. 12, 2004, pp. 1-590, No. V2.0, USA.

* cited by examiner

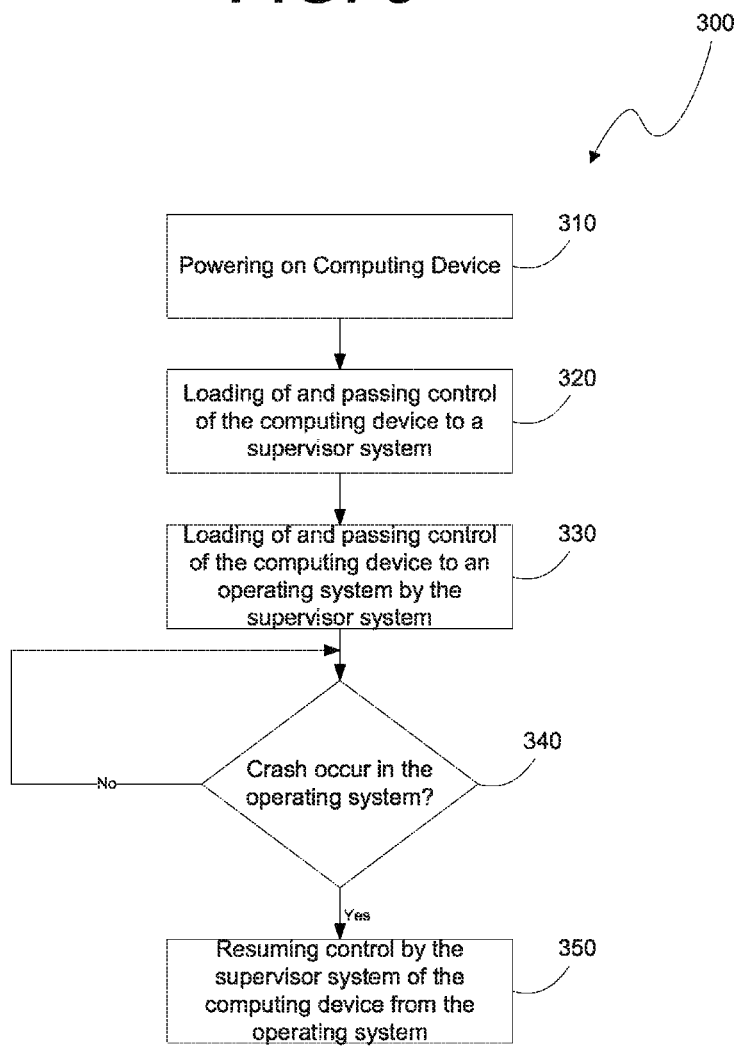

SUPERVISOR SYSTEM RESUMING CONTROL

BACKGROUND

In a remote administration environment, an administrator may not have physical access to computing devices being managed by the administrator. Nonetheless, the computing devices generally have software installed that allows the administrator to remotely access the computing devices.

BRIEF DESCRIPTION OF THE DRAWINGS

The following detailed description references the drawings, wherein:

FIG. 3 is a flowchart of an example method for remote crash recovery of the computing device.

DETAILED DESCRIPTION

Specific details are given in the following description to provide a thorough understanding of embodiments. However, it will be understood by one of ordinary skill in the art that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

Embodiments provide a method and/or device for remote administration of a computing device to continue without physical intervention after an operating system of the computing device suffers an unrecoverable crash. Generally, the computing device must be physically reset after the operating system of the computing device suffers an unrecoverable crash. However, embodiments provide a supervisor system to run the operating system, such that when the operating system suffers from an unrecoverable crash, the supervisor system is to resume control of the computing device without physically resetting the computing device. Therefore, remote administration of computing device may continue through the supervisor system without physical intervention, where physical intervention would include sending personnel to a physical site of the computing device to physically reset the computing device.

Thus, embodiments may reduce or prevent the likelihood for physical intervention of a remotely administered computing device that suffers an unrecoverable crash to the operating system of the computing device. In addition, embodiments may allow the supervisor system to carry post crash solutions, such as remotely communicating diagnostic information to an administrator or remotely restarting the computing device.

Figure 1:
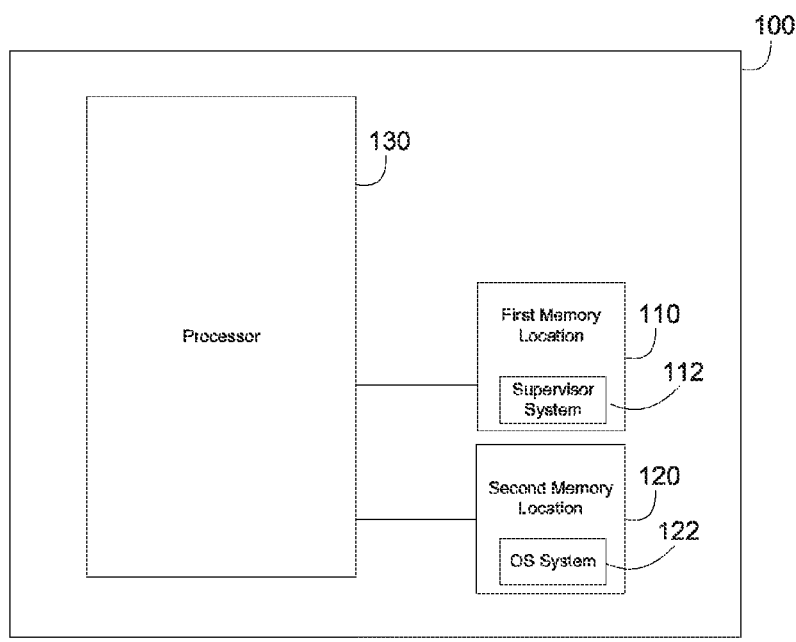
FIG. 1 is a block diagram of an example computing device.

FIG. 1 is a block diagram of an example computing device 100. Embodiments of the computing device 100 may include, for example, a notebook computer, a desktop computer, an all-in-one system, a slate computing device, a portable reading device, a wireless email device, a mobile phone, and the like. In the embodiment of FIG. 1, the computing device 100 includes a first memory location 120, a second memory location 120, and a processor 130.

The first and second memory locations 110 and 120 may be one or more machine-readable storage mediums such as any electronic, magnetic, optical, or other physical storage device that contains or stores executable instructions. Thus, the first and second memory locations 110 and 120 may be, for example, Random Access Memory (RAM), an Electrically Erasable Programmable Read-Only Memory (EEPROM), a storage drive, a Compact Disc Read Only Memory (CD-ROM), and the like.

While the first and second memory locations 110 and 120 are shown to be physically separate machine-readable storage mediums in FIG. 1, embodiments may include the first and second memory locations 110 and 120 to be part of a single machine-readable storage medium. For example, the first and second memory locations 110 and 120 may share a common address structure, with the first memory location having a lower memory address than the second memory location. Also, the single machine-readable storage medium may be partitioned, such as physically or logically, into two or more partitions, with the first and second memory locations 110 and 120 occupying different partitions of the single machine-readable storage medium.

The first and second memory locations 110 and 120 may store one or more applications or operating systems executable by the processor 130. In FIG. 1, the first memory location 110 is shown to store a supervisor system 112 to launch and monitor an operating system 122 and the second memory location 120 is shown to store an operating system 122 to control the computing device 100.

The processor 130 is to boot the computing device 100 based on the supervisor system 112. The term boot may refer to an initial set of operations that the computing device 100 performs when powered on. For example, upon powering on the computing device 100, the processor 130 may first execute instructions stored in the supervisor system 112. Alternatively, the processor 130 may first execute instructions in a basic input/output system (BIOS) or the like that then point to instructions of the supervisor system 112.

The supervisor system 112 may be a type of software including programs and/or data that interfaces between hardware of the computing device 100 and the operating system 122. A functionality of the supervisor system 112 may be flexible and determined according to a user's or manufacturer's specification. Therefore, while the supervisor system 112 may launch and monitor the operating system 122, such as via a process of the supervisor system 112, the supervisor system 112 can also be designed for additional functionality, as will be explained in greater detail below.

The supervisor system 112 is to transfer control of the computing device 100 to the operating system 122 and is to resume control of the computing device 100 when a crash occurs in the operating system 122. The term crash may refer to when a program running on the operating system 122 or at least part of the operating system 122 fails to operate properly. For example, the program or operating system 122 may stop responding to inputs, such as during a freeze or hang. Generally, crashes are a result of an instruction being executed by the processor 130 that causes an error to occur, such as a program counter being set to an incorrect address or the processor 130 overwriting an incorrect memory address.

The operating system 122 may not be able to automatically recover or resume proper functionality after some types of crashes. These types of crashes are generally referred to as unrecoverable crashes and typically require a hard reset of the computing device 100, where the computing device 100 must be initially powered down physically. For example, the hard reset may be carried out initially by continuous pressing down of a power button of the computing device 100 by the user for a threshold length of time, such as three or five seconds. After the computing device 100 is powered down, the computing device 100 may be powered on again, either remotely or by pressing the power button again, to complete the resetting of the computing device 100.

Data or software may be lost or damaged by the hard reset because the operating system 122 is unable to save or transmit data or carry out various other types of operations, such as proper shutdown procedures. Moreover, the hard reset cannot be carried out remotely. Therefore, a person, such as a user or service provider, must be at a physically present at a site of the computing device 100 that has suffered an unrecoverable crash.

However, in embodiments, the supervisor system 112 may resume control of the computing device 100 without resetting power to the computing device 100 when the operating system 122 is unable to recover from the crash. For example. in one embodiment, the supervisor system 112 is to enter a sleep state after transferring control of the computing device to the operating system 122. The supervisor system 112 is to then wake from the sleep state in response to at least one of a hardware and software interrupt. The operating system 122 may generate the software interrupt in response to a failure to execute an instruction, and the computing device 100 or operating system 122 may generate the hardware interrupt in response to an expiration of a timer, such as a watchdog timer. In addition, embodiments are not limited to the interrupts described above and the supervisor system 112 may be awoken in response to the other types of interrupts known in the art for detecting the crash.

The supervisor system 112 is to disable control of the computing device 100 by the operating system 122 when controlling the computing device 100. For example, the supervisor system 112 may terminate the process running the operating system 122 in order to free up management of system resources of the computing device 100 that were previously controlled by the operating system 122. Additional functionalities of the supervisor system 112 may include accessing logs of the computing device 100 and executing operations on the computing device 100 previously For example, the supervisor system 112 may access error or security logs. The error logs may indicate, for example, a hardware component or software instruction of the computing device 100, responsible for the crash. The security logs may indicate, for example, which users accessed one or more hardware or software components of the computing device 100.

Executing operations of the computing device 100 may include, for example, the supervisor system 112 managing power settings of the computing device 100 when controlling the computing device 100. The power settings may include a hibernation, sleep, reduced power, shutdown or restart state. Further, the supervisor system 112 may reimage or reformat the second memory location when managing the operations of the computing device. For example, the supervisor system 112 may reinstall the operating system 122 at the second memory location, such as when the operating system 122 has been corrupted or damaged beyond repair.

Figure 2:
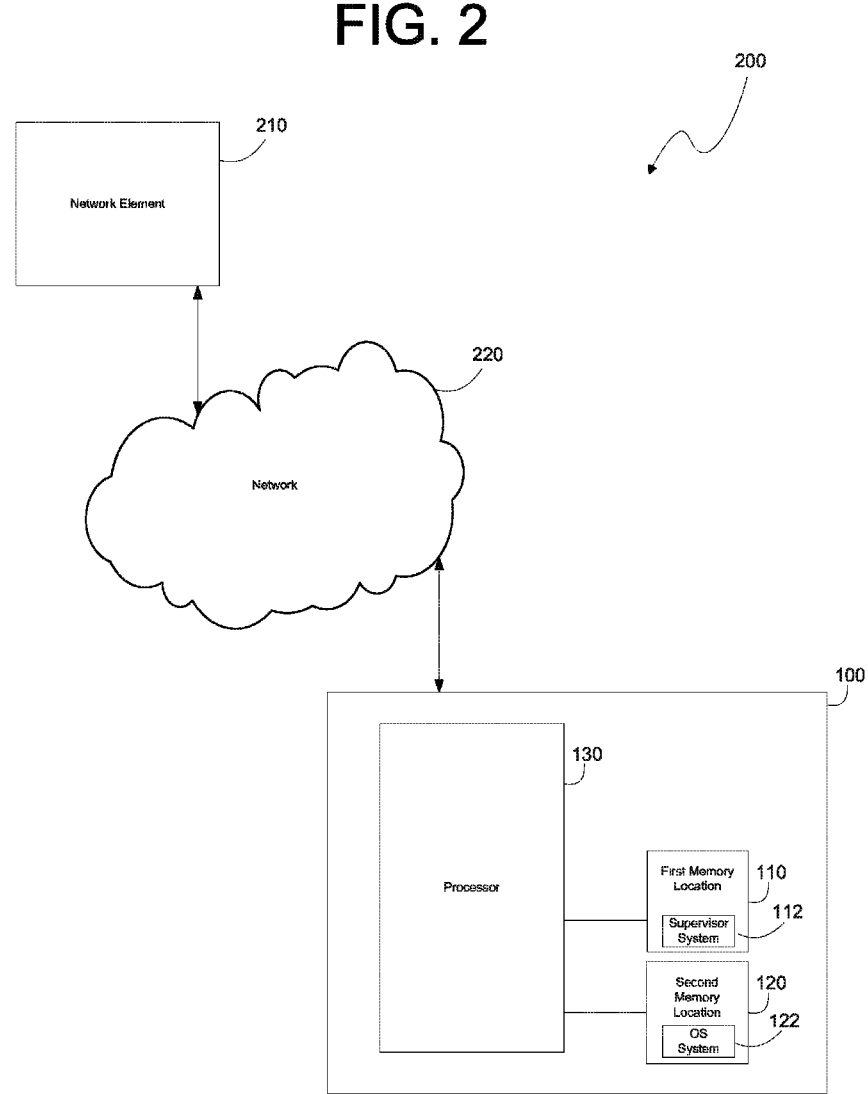
FIG. 2 is a block diagram of an example network system including the computing device of FIG. 1.

FIG. 2 is a block diagram of an example network system 200 including the computing device 100 of FIG. 1. In the embodiment of FIG. 2, the network system 200 includes the computing device 100, a network element 210, and a network 220.

The network element 210 may include any type of device capable of communicating with the computing device 100 over the network 220, such as a server, a modem, a network card, and the like. The network element 210 may include or be part of a larger infrastructure, such as administration site, used by an administrator or user to monitor or manage the computing device 100 remotely.

The network 220 may include one or more interconnected devices, such as network interface cards, repeaters, hubs, bridges, switches, routers, firewalls, and the like. The interconnected devices may share resources or information, such as communications between the network element 210 and the computing device 100.

The network element 210 is to monitor and control the computing device 100 through the network 220, the network element 210 to communicate with the supervisor system 112 when the crash occurs in the operating system 122. For example, the network element 210 may access error or security logs of the computing device, execute diagnostic operations on the computing device, or restart the computing device through the network 220.

Further, the network element 220 may wake the supervisor system 112 of the computing device 100 from a sleep state, where the supervisor system 112 is to enter a sleep state after and transferring control of the computing device 100 to the operating system 122.

FIG. 3 is a flowchart of an example method 300 for remote crash recovery of the computing device. Although execution of the method 300 is described below with reference to the computing device 100 of FIG. 1, other suitable components for execution of the method 300 will be apparent to those of skill in the art.

In the embodiment of FIG. 3, at block 310, the computing device 100 is powered on. Next, at block 320, the supervisor system 112 stored at the first memory location 110 is loaded and control of the computing device 100 is passed to the supervisor system 112. Then, at block 330, the operating system 122 stored at the second memory location 120 is loaded and the supervisor system 112 passes control of the computing device 100 to the operating system 122. Subsequently, at block 340, the supervisor system 112 monitors the operating system 122 for a crash. The monitoring at block 340 may include the supervisor system 112 entering a sleep state and the supervisor system 112 waking from the sleep state in response to a generated interrupt.

If the operating system 122 crashes, at block 350, the supervisor system 112 resumes control of the computing device 100 from the operating system 122. The supervisor system 112 may be notified of the crash by the generated interrupt. As explained above, the interrupt may be, for example, a software interrupt generated in response to a failure to execute an instruction or a hardware interrupt generated in response to an expiration of a timer.

The supervisor system's 112 resuming control at block 350 may include disabling control of the computing device 100 by the operating system 122 and resuming control without resetting power to the computing device 100. After resuming control, the supervisor system 112 may communicate with the network element 210 through the network 220, as explained above. For example, the network element 210 may access error logs of the computing device 100, execute diagnostic operations on the computing device 100, or restart the computing device 100 through the network 220.

According to the foregoing, embodiments provide a method and/or device for remote administration of a computing device to continue without physical intervention after an operating system of the computing device suffers an unrecoverable crash. For example, embodiments provide a supervisor system to run the operating system, such that when the operating system suffers from an unrecoverable crash, the supervisor system is to resume control of the computing device without physically resetting the computing device. Therefore, remote administration of computing device may continue through the supervisor system without physical intervention.

We claim:

1. A computing device, comprising:
   a first memory location storing a supervisor system to launch and monitor an operating system;
   a second memory location storing the operating system to control the computing device; and
   a processor to boot the computing device based on the supervisor system, wherein
   the supervisor system is to transfer control of the computing device to the operating system,
   the supervisor system is to enter a sleep state after transferring control of the computing device to the operating system,
   the supervisor system is to wake from the sleep state in response to at least one of a hardware and software interrupt, and
   the supervisor system is to resume control of the computing device when a crash occurs in the operating system.

2. The computing device of claim 1, wherein the supervisor system is to resume control of the computing device without resetting power to the computing device when the operating system is unable to recover from the crash.

3. The computing device of claim 1, wherein the operating system is to generate the software interrupt in response to a failure to execute an instruction, and
   the computing device is to generate the hardware interrupt in response to an expiration of a timer.

4. The computing device of claim 1, wherein the supervisor system is to disable control of the computing device by the operating system when controlling the computing device.

5. The computing device of claim 4, wherein the supervisor system is to at least one of access logs of the computing device and execute operations on the computing device.

6. The computing device of claim 4, wherein the supervisor system is to manage power settings of the computing device, the power settings including at least one of a hibernation, sleep, reduced power, shutdown and restart state, when controlling the computing device.

7. The computing device of claim 4, wherein the supervisor system is to at least one of reimage and reformat the second memory location when managing the operations of the computing device.

8. The computing device of claim 1, wherein the supervisor system is to communicate with a :network element through a network, when the crash occurs in the operating system, where the supervisor system is to receive instructions from the network element for monitoring and controlling the computing device through the network.

9. The computing device of claim 8, wherein the supervisor system is to at least one of transmit error logs of the computing device, execute diagnostic operations on the computing device, and restart the computing device in response requests received from the network element through the network.

10. The computing device of claim 8, wherein the supervisor system is to receive a wake command from the network element to awaken from a sleep state, the supervisor system to enter the sleep state after transferring control of the computing device to the operating system.

11. A method for remote crash recovery of a computing device, comprising:
    powering on the computing device;
    loading of and passing control of the computing device to a supervisor system stored at a first memory;
    loading of and passing control of the computing device to an operating system stored at a second memory, by the supervisor system, wherein the supervisor system is to enter a sleep state after passing control of the computing device to the operating system;
    waking the supervisor system from the sleep state in response to at least one of a hardware and software interrupt;
    monitoring the operating system for a crash, by the supervisor system; and
    resuming control by the supervisor system of the computing device from the operating system when the crash occurs in the operating system.

12. The method of claim 11, further comprising:
    communicating with a network element through a network after the resuming control, where the network element is to monitor and control the computing device through the network, wherein
    the communicating includes the network element at least one of accessing error logs of the computing device, executing diagnostic operations on the computing device, and restarting the computing device through the network.

13. The method of claim 11, wherein,
    the resuming control includes disabling control of the computing device by the operating, system, and
    the resuming resumes control without resetting power to the computing device.

14. A machine-readable storage medium storing a supervisor system having computer-executable instructions, that when executed on a processor of a computing device, cause the computing device to execute steps, comprising:
    transferring control of the computing device to the supervisor system;
    loading an operating system via the supervisor system, the supervisor system to pass control of the computing device to the operating system, wherein the supervisor system is to enter a sleep state after passing control of the computing device to the operating system;
    waking the supervisor system from the sleep state in response to at least one of a hardware and software interrupt;
    monitoring the operating system for a crash via the supervisor system; and
    resuming control via the supervisor system of the computing device from the operating system when the crash occurs in the operating system.

* * * * *